US008629369B2

(12) United States Patent
Tenzer

(10) Patent No.: US 8,629,369 B2
(45) Date of Patent: *Jan. 14, 2014

(54) LOW IMPACT SPOT WELDING CYLINDER USING SINGLE OR DOUBLE PISTON

(75) Inventor: Peter Tenzer, Windsor (CA)

(73) Assignee: Doben Limited, Windsor (CA)

( * ) Notice: Subject to any disclaimer, the term of this patent is extended or adjusted under 35 U.S.C. 154(b) by 1179 days.

This patent is subject to a terminal disclaimer.

(21) Appl. No.: 12/676,784

(22) PCT Filed: Aug. 11, 2005

(86) PCT No.: PCT/CA2005/001239
§ 371 (c)(1),
(2), (4) Date: Mar. 5, 2010

(87) PCT Pub. No.: WO2006/060891
PCT Pub. Date: Jun. 15, 2006

(65) Prior Publication Data
US 2010/0213246 A1    Aug. 26, 2010

Related U.S. Application Data

(60) Provisional application No. 60/635,086, filed on Dec. 10, 2004.

(51) Int. Cl.
*B23K 9/23* (2006.01)

(52) U.S. Cl.
USPC ............................... 219/89; 219/91.2; 91/420

(58) Field of Classification Search
USPC ........................ 219/89, 91.2; 91/167 R, 420
See application file for complete search history.

(56) References Cited

U.S. PATENT DOCUMENTS

| 4,135,076 A | 1/1979 | Beneteau |
| 4,296,679 A | 10/1981 | Mattsson |
| 4,700,611 A | 10/1987 | Kaneko |

(Continued)

FOREIGN PATENT DOCUMENTS

| EP | 1 398 105 | 3/2004 |
| JP | 8-309552 | 11/1996 |

OTHER PUBLICATIONS

European Search Report for EP Application No. 05772221.7, Oct. 2, 2008.

(Continued)

*Primary Examiner* — Brian Jennison
(74) *Attorney, Agent, or Firm* — Carlson, Gaskey & Olds, P.C.

(57) ABSTRACT

A weld cylinder having a single piston arrangement is provided. The cylinder has a movable retract piston assembly with the piston arranged within the retract piston assembly. The piston supports a rod that is movable between home, intermediate, work, and advanced work positions. The rod moves rapidly from the home position to the intermediate position however, the rod moves more slowly from the intermediate position to the work position to reduce the impact force. A cushion chamber slowly exhausts through a pre-orifice and a hole in the cushion valve while an isolator is in an open position. Once the cushion valve opens in response to a retract-forward pressure on the cushion valve, the cushion chamber exhausts rapidly so that weld force increases rapidly to minimize increases in cycle time. Advance of a retract piston assembly is also cushioned. A weld-forward port is no longer provided on a cylinder barrel.

27 Claims, 10 Drawing Sheets

(56) References Cited

U.S. PATENT DOCUMENTS

| | | |
|---|---|---|
| 5,177,337 A | 1/1993 | Ward |
| 5,191,825 A | 3/1993 | Beneteau et al. |
| 5,275,540 A | 1/1994 | Brown |
| 5,623,861 A * | 4/1997 | Ward et al. .................. 91/420 |
| 5,789,719 A * | 8/1998 | Pary et al. .................. 219/86.25 |
| 5,796,067 A | 8/1998 | Enyedy et al. |
| 6,054,669 A | 4/2000 | Warren, Jr. |
| 6,408,740 B1 | 6/2002 | Holt et al. |
| 6,528,948 B1 * | 3/2003 | Hershcovitch et al. .. 315/111.71 |
| 6,722,257 B2 | 4/2004 | Yoh et al. |
| 7,214,902 B2 * | 5/2007 | Vanderzwet .................. 219/89 |
| 7,223,933 B2 | 5/2007 | Vanderzwet |
| 2002/0066363 A1 | 6/2002 | Holt et al. |
| 2002/0117051 A1 | 8/2002 | Yoh et al. |
| 2003/0089684 A1 | 5/2003 | Beauregard et al. |
| 2006/0124606 A1 | 6/2006 | Tenzer |
| 2006/0124607 A1 | 6/2006 | Tenzer |

OTHER PUBLICATIONS

International Search Report for PCT Application No. PCT/CA2005/001239, Dec. 2, 2005.

* cited by examiner

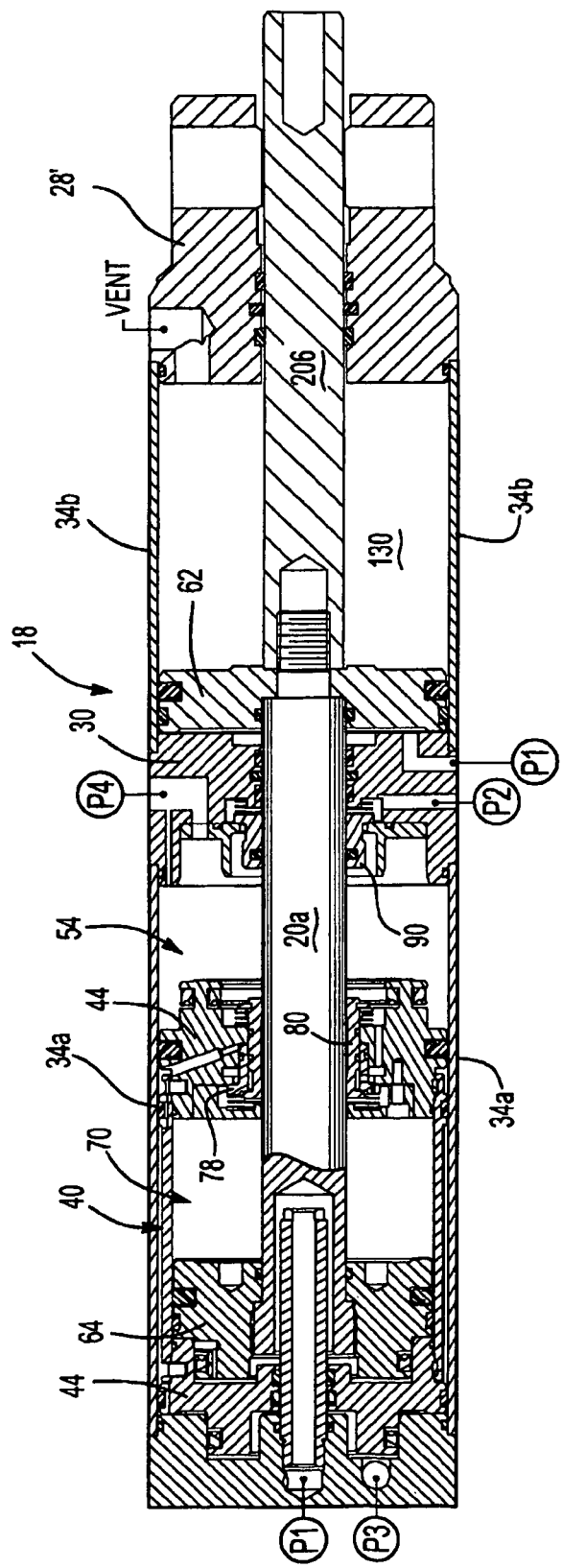

LOW IMPACT SPOT WELDING CYLINDER USING SINGLE OR DOUBLE PISTON

The application claims priority to U.S. Provisional Application No. 60/635,086 filed Dec. 10, 2004.

BACKGROUND OF THE INVENTION

The present invention relates to a weld gun used in spot welding, and more particularly, the invention relates to either a single or double piston welding cylinder for the weld gun generating a low impact force when the weld gun engages the workpiece to perform a spot weld.

A typical weld gun used in spot welding includes opposing arms each having an electrode that applies current to a workpiece to generate a weld nugget, for example, between two sheets of metal. The electrodes include malleable welding caps typically manufactured from a copper alloy. Repeated impact force between the welding caps and the workpiece plastically deforms the welding caps thereby increasing the wear of the welding caps and reducing the service life, which increases operating cost.

Impact force between the welding caps and workpiece also generates workpiece distortion, which can have detrimental effects on the welding process and quality of the weld.

Several prior art weld cylinders have endeavored to reduce the impact force between the welding caps and workpiece to extend the life of welding caps and reduce workpiece distortion. One approach in the prior art has been to slow the advance of the electrodes toward one another by slowing the movement of the pneumatic cylinder. However, while this approach reduces the impact force it also increases the cycle time for a spot weld, which is undesirable. Another drawback is that typically the greater the retract stroke length, the narrower the low impact region becomes relative to the stroke. This is problematic in that the internal components of the weld cylinder must be customized depending upon the application. A more versatile weld cylinder design would provide common components for a wider variety of applications.

Another approach in the prior art is to utilize external devices or peripheral components such as valves, regulators, restrictors, and/or electrical switches to control the pressure, timing, and rate that the air is supplied to the pneumatic cylinder thereby controlling the impact force. However, the addition of these externals devices may be difficult to integrate with existing weld guns and is also costly since additional components must be added to the welding system. It is desirable to use the current industry pneumatic actuating systems so that the inventive weld cylinder may be used with current systems. For example, in four weld port systems, the ports are typically pressurized in pairs to achieve the three different weld cylinder stroke positions.

One of the ports on prior art systems is typically provided on a barrel that extends between the ends of the cylinder. The barrel port is a costly feature in that it requires a two-piece tubular wall with a separator arranged between the walls. The multiple components of the barrel must incorporate several seals. As an alternative to using the separator, the port may be welded to a singular tubular wall, which requires subsequent machining of the inner surface of the barrel. Further, the welding process is difficult to control.

Therefore, what is needed is a pneumatic cylinder that reduces impact force between the welding caps and the workpiece but that does not require additional, costly design features or external devices and increases in cycle time.

SUMMARY OF THE INVENTION

The present provides a weld cylinder having a single or dual piston arrangement. The cylinder has a movable retract piston assembly with the piston arranged within the retract piston assembly. The piston supports a rod that is movable between home, intermediate, work, and fully advanced work positions. The rod moves rapidly from the home position to the intermediate position. However, the rod moves more slowly from the intermediate position to the work position to reduce the impact force. A cushion valve supported by the retract piston assembly and a cushion trip valve supported by a front block cooperate to increase the rate at which the rod moves from the work position to the advanced position so that weld force increases rapidly to minimize increases in cycle time.

A weld-return port is provided on the front block so that weld-ports need not be provided on the barrel. A cushion chamber is pressurized using weld-return air. Notches are provided in the retract piston assembly to fluidly connect the retract-forward air to the cushion valve, which is carried by a rearward flange in the retract piston assembly.

The cushion valve includes a pre-orifice to permit some cushion air to exhaust from the cushion chamber prior to reaching the intermediate position, which enables the rod to advance more smoothly and quickly. An isolator valve opens when it engages the trip valve during the advance of the retract piston assembly. The trip valve is also opened at this time. When both the cushion valve and cushion trip valve move from closed positions to open positions, the rate of fluid flow through the retract piston assembly increases, and so too does the rate at which the piston moves within the retract piston assembly.

The cushion valve is a differential pressure valve that is exposed to the pressure within the cushion chamber and retract-forward air pressure. As the pressure in the cushion chamber falls as the chamber is exhausted and the retract-forward air pressure rises, the cushion valve will open. The opened cushion valve enables the cushion chamber to be exhausted even more rapidly so that the weld force can build quickly.

A second cushion chamber is provided between the retract piston assembly and the front block to smooth engagement between the retract piston assembly and the front block. A sealed chamber is created between the rearward flange and the front block as the retract piston assembly approaches the front block. A passage fluidly connects the second cushion chamber and the retract-return port, which is vented to atmosphere at this cylinder position.

Accordingly, the present invention provides a pneumatic cylinder that reduces initial impact force between the welding caps and the workpiece, but that does not require additional, costly external devices and increases in cycle time.

These and other features of the present invention can be best understood from the following specification and drawings, the following of which is a brief description.

BRIEF DESCRIPTION OF THE DRAWINGS

FIG. 9 is a cross-sectional view of a dual piston weld cylinder in the home position.

DETAILED DESCRIPTION OF THE PREFERRED EMBODIMENT

Figure 1:
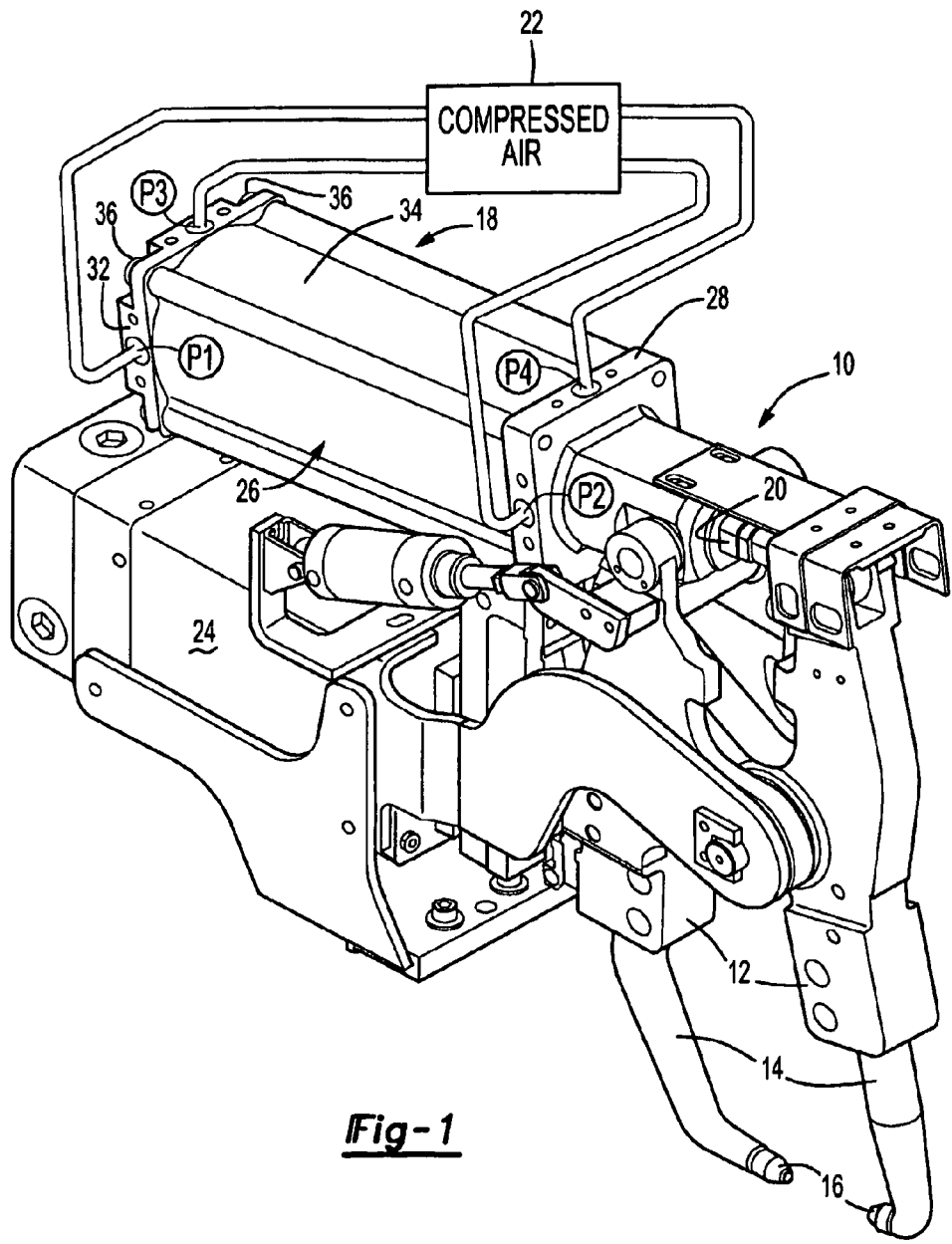
FIG. 1 is a perspective view of an inventive weld gun.

An inventive weld gun 10 including an inventive pneumatic cylinder 18 is shown in FIG. 1. The pneumatic cylinder 18 is a four port arrangement ports (P1-P4) that can be easily integrated into existing weld guns utilizing four ports. That is, the plumbing for prior art weld guns having four ports can be used with the inventive pneumatic cylinder 18 without modification to the welding system. The ports P1-P4 are fluidly connected to a compressed air source 22. The ports P1-P4 are connected to the compressed air source 22 through valves that control the timing of the air signals provided to the pneumatic cylinder 18 by selectively opening and closing the valves.

The weld gun 10 includes opposing arms 12 that each include an electrode 14. The electrodes 14 include welding caps 16 that are typically manufactured from a malleable copper alloy. The welding caps 16 engage a workpiece (not shown) to apply a welding current to the workpiece to generate a weld nugget, as is well known in the art. The arms 12 are typically supported by the weld gun 10 and interconnected to one another at various pivot points. A rod 20 of the pneumatic cylinder 18 is typically connected to one of the arms 12 to actuate the electrodes 14 and welding cap 16 between electrode positions corresponding to home (fully returned), intermediate, and work (caps 16 and workpiece engaged) positions. Current is applied to the electrodes 14 when in the work position using a current source 24 that is electrically connected to the electrodes 14.

Port P1 provides weld-forward air when pressurized. Port P2 provides weld-return air when pressurized. Port P3 provides retract-forward air when pressurized, and port P4 provides retract-return air when pressurized. Typically, the ports are pressurized in pairs to achieve a desired position with the other, non-pressurized ports vented to atmosphere. In the example shown, the weld-return and retract-return ports, P2 and P4, are pressurized to obtain the home position. The weld-return and retract-forward ports, P2 and P3, are pressurized to obtain the intermediate position. The weld-forward and retract-forward ports, P1 and P3, are pressurized to obtain the work position. The fully advanced work position is the travel limit of the work position. The rod 20 may be actuated between the above three positions or directly from the home position to the work position by actuating the desired valves. It should be understood that the work position is not necessarily a discrete position, but rather, may be any distance along which the rod 20 moves between the intermediate position and the fully advanced work position. The various positions and the condition at the ports is expressed in the following table:

|  | Weld-Forward (P1) | Weld-Return (P2) | Retract-Forward (P3) | Retract-Return (P4) |
| --- | --- | --- | --- | --- |
| Home | vented | pressurized | vented | pressurized |
| Intermediate | vented | pressurized | pressurized | vented |
| Work | pressurized | vented | pressurized | vented |

The pneumatic cylinder 18 includes a cylinder body 26 that has a barrel 34 and an end cap 32 arranged at one end. A front block 28 is arranged at the other end of the barrel 34. The fasteners 36 secure the components of the cylinder body 26 together so the pneumatic cylinder 18 can be pressurized at ports P1-P4 without leakage from the cylinder body 26. There is no port (typically the weld-return port) provided on the inventive barrel 34, as in some of the prior art and Applicant's other weld cylinders. Instead, the weld-return port is provided on the front block 28. It should be understood that the ports may be arranged on the cylinder other than described and shown. For example, the ports may be repositioned to provide desired packaging of the weld cylinder.

The multiple component cylinder body 26 and its configuration described above are exemplary of a four/port pneumatic cylinder having a single piston arrangement. However, it should be understood that other configurations may be used and still fall within the scope of the present invention. For example, a dual cylinder incorporating the present invention is shown in FIG. 9.

Figure 2:
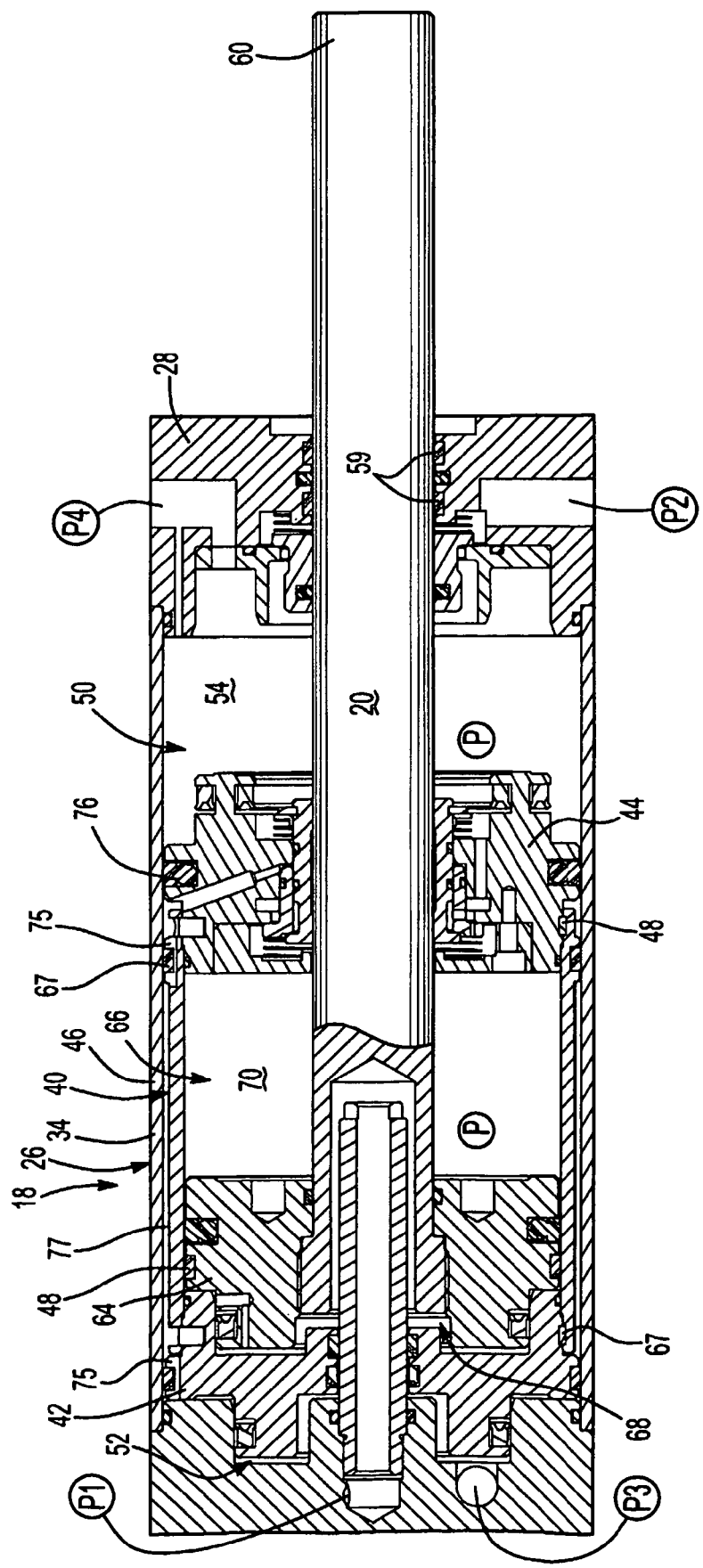
FIG. 2 is a cross-sectional view of a single piston weld cylinder shown in FIG. 1 in the home position.
Figure 3A:
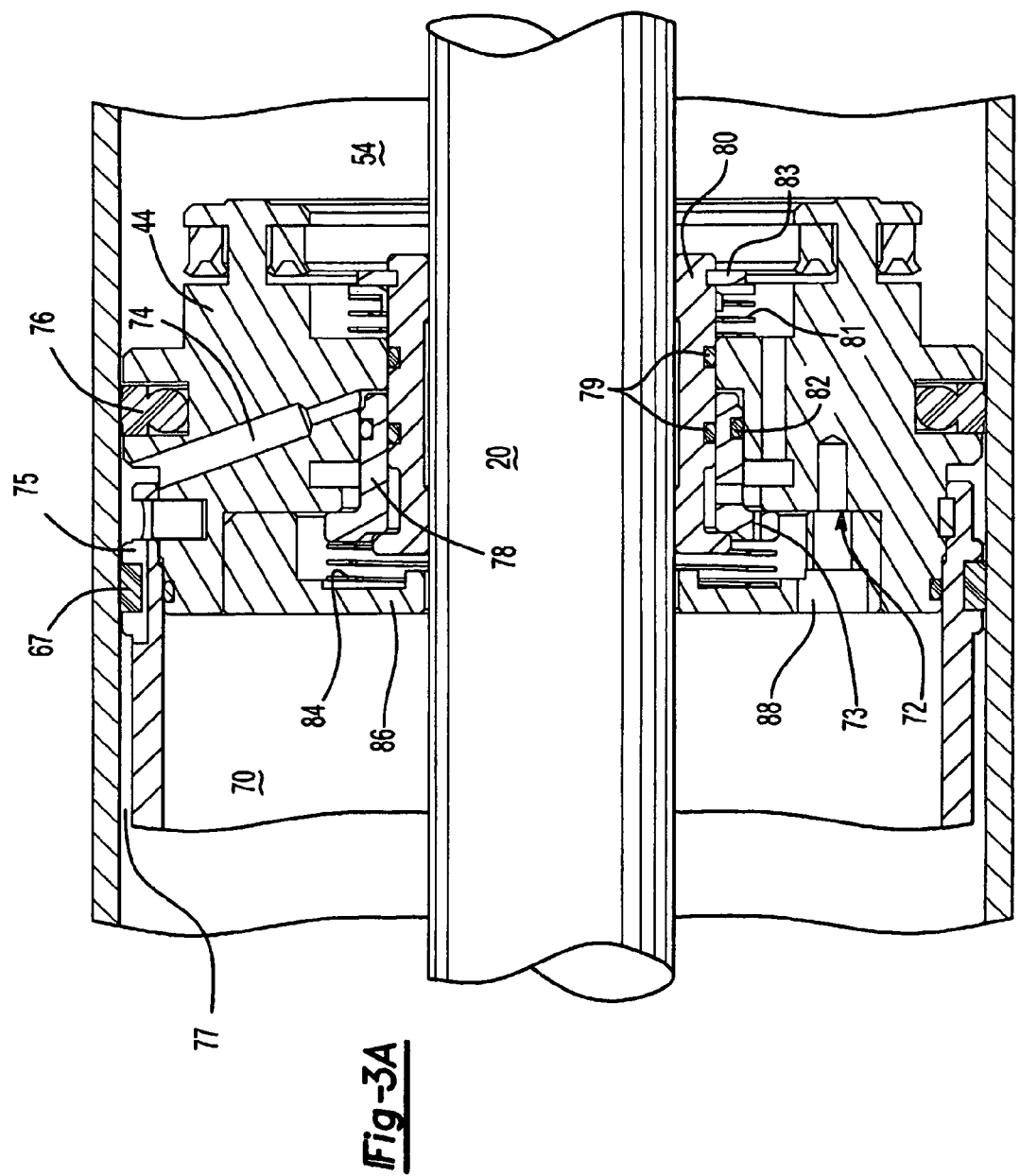
FIG. 3A is an enlarged view of the rearward flange of the retract piston assembly shown in FIG. 2.
Figure 3B:
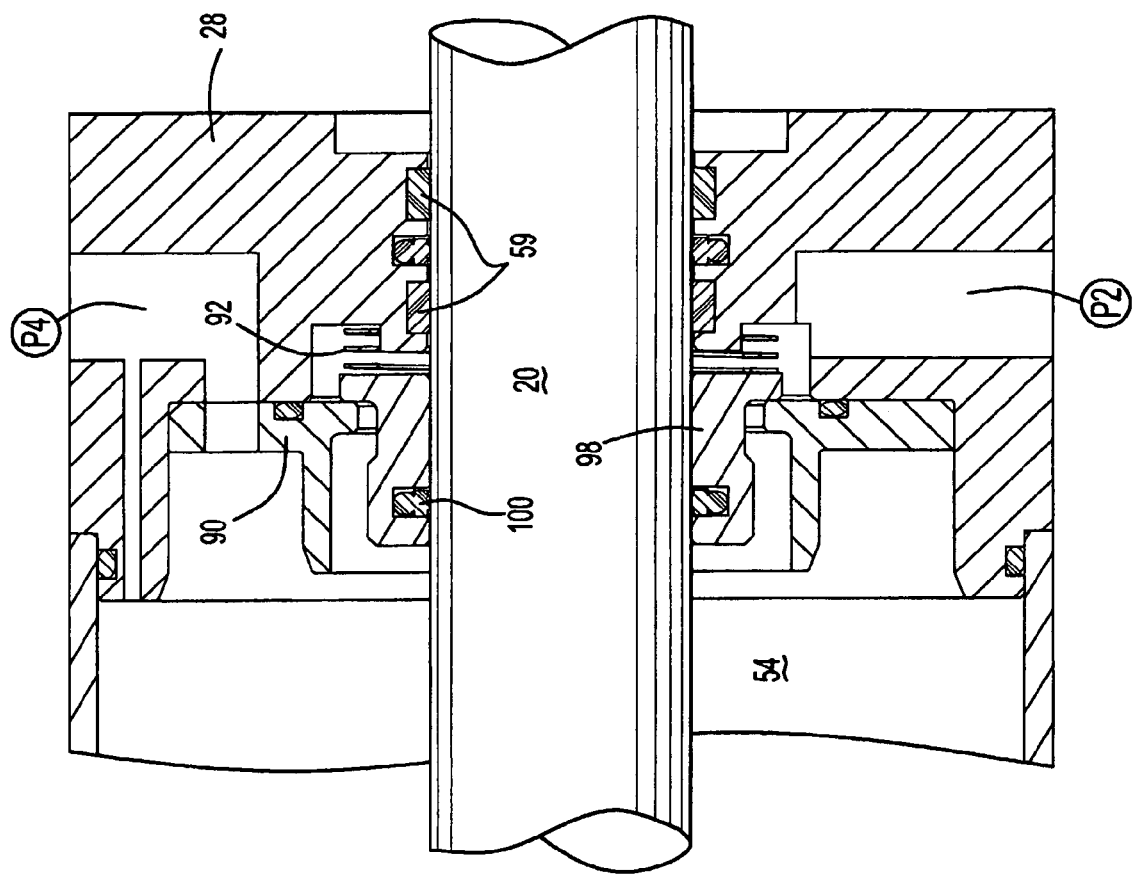
FIG. 3B is an enlarged view of the front block of the retract piston assembly shown in FIG. 2.
Figure 4:
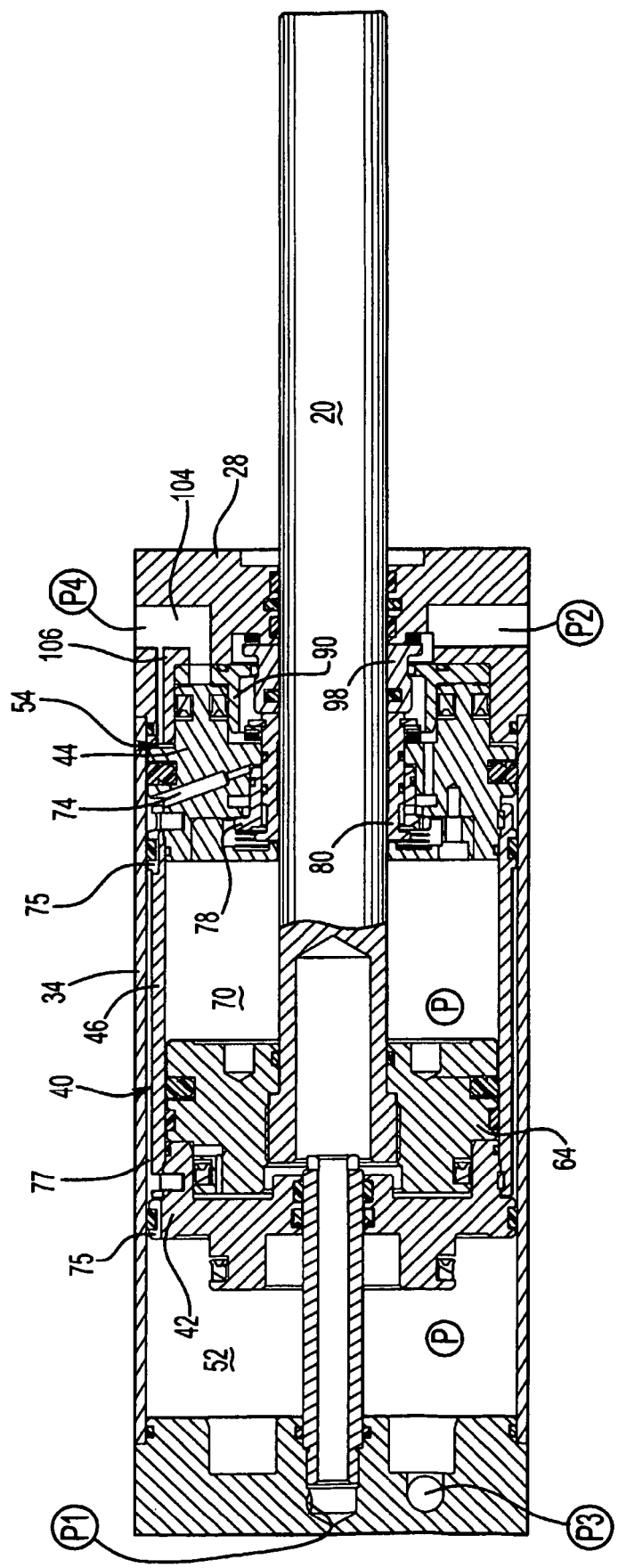
FIG. 4 is a cross-sectional view of single piston weld cylinder shown in FIG. 1 in the intermediate position.
Figure 5:
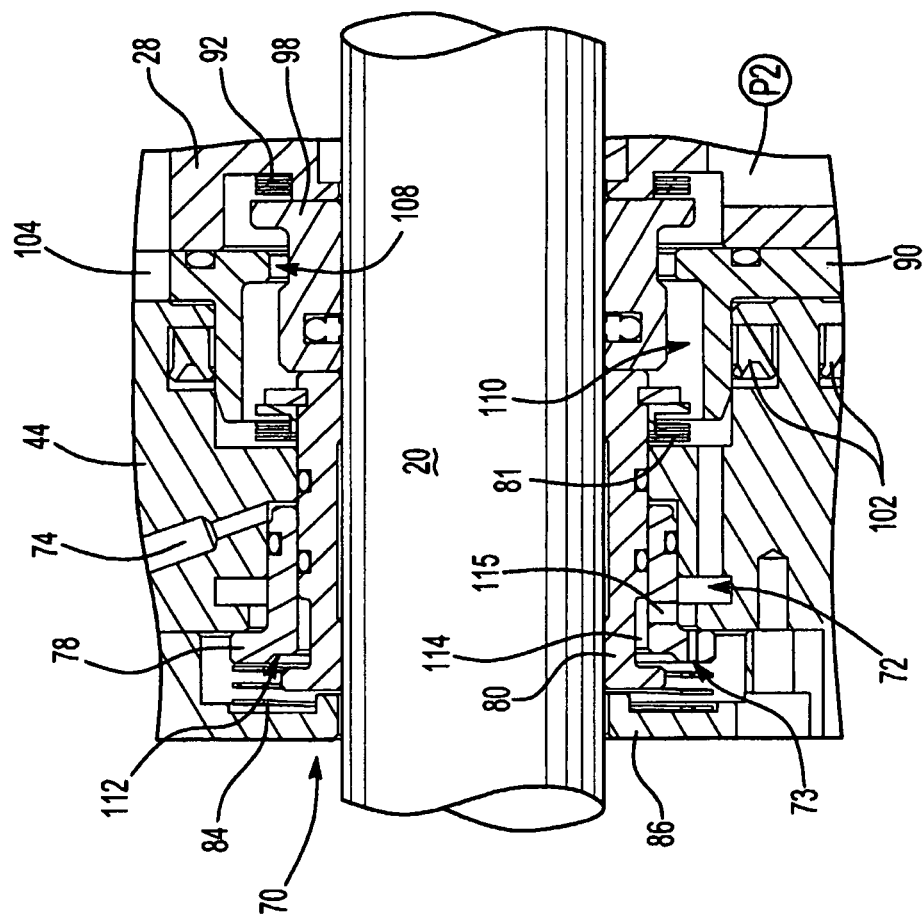
FIG. 5 is an enlarged view of the rearward flange engaging the front block, as shown in FIG. 4.
Figure 6:
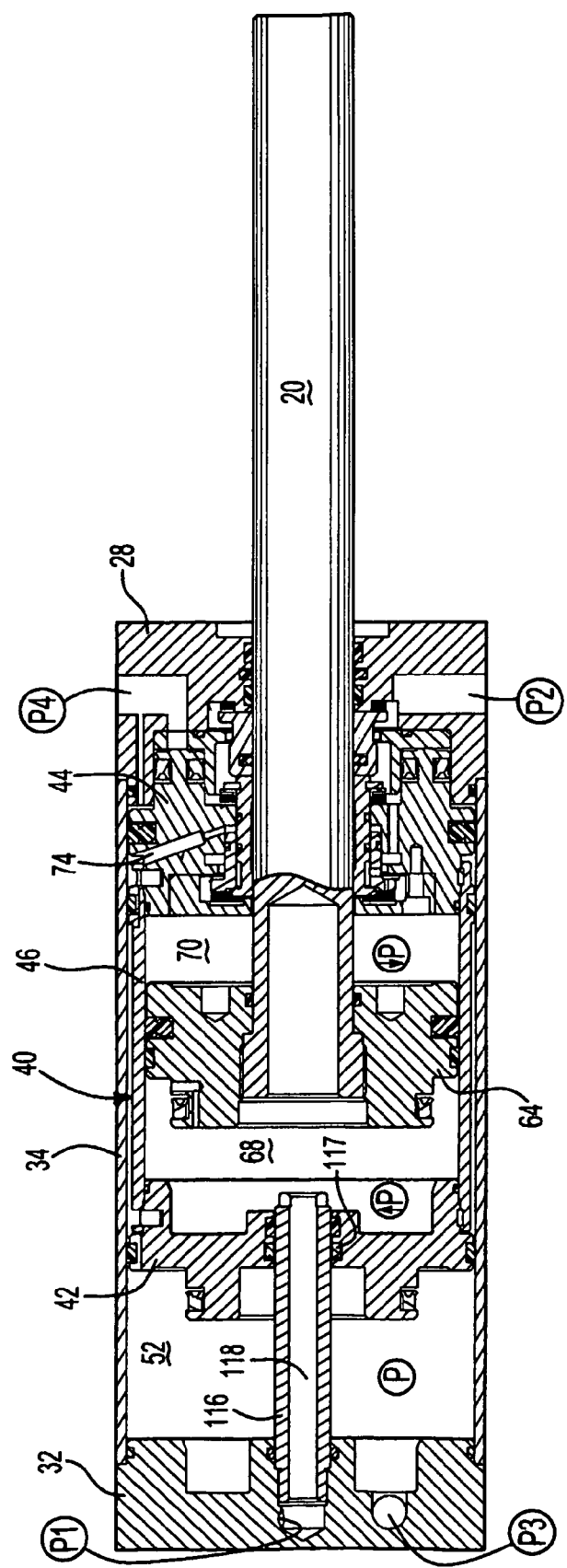
FIG. 6 is a cross-sectional view of single piston weld cylinder shown in FIG. 1 in the work position.
Figure 7:
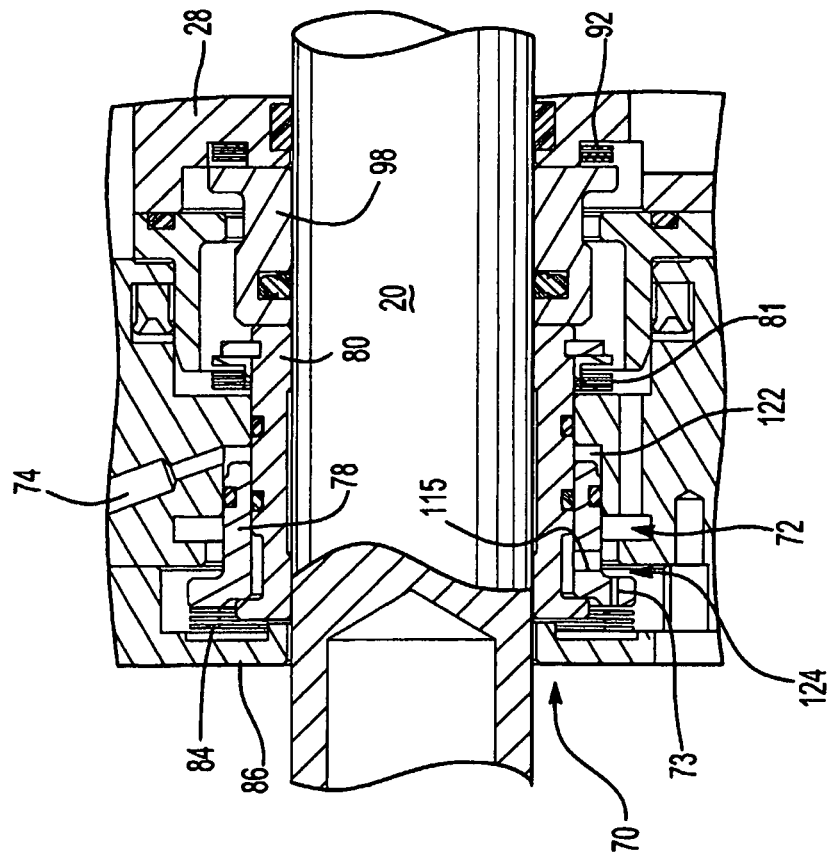
FIG. 7 is an enlarged view of the rearward flange engaging the front block with the cushion valve open, as shown in FIG. 6.

In the example embodiment of the inventive pneumatic cylinder 18, three cylinder positions are generated. FIGS. 2, 3A and 3B depict a home position of the pneumatic cylinder 18. FIGS. 4 and 5 show an intermediate position of the pneumatic cylinder 18, and FIGS. 6 and 7 depict a work position of the pneumatic cylinder 18. The work or weld position may lie anywhere between the intermediate position and the fully advanced position depending on the mechanical system and the workpiece. The position variation is used in the process to ensure the weld force is maintained as the electrodes deflect under mechanical load, the electrode wear, and as the workpiece becomes distorted during the welding process. In the fully advanced position, a weld flange 64 is in close proximity to or engages a rearward flange 44.

The present invention pneumatic cylinder 18 moves the rod 20 quickly from the home position (FIG. 2) to the intermediate position (FIG. 4) in which the welding caps 16 are in close proximity to the workpiece. However, the rod 20 moves more slowly from the intermediate position (FIG. 4) to the work position (FIG. 6) in which the welding caps 16 sufficiently forcefully engage the workpiece. The rod 20 moves forward and additional distance to increase the weld force so that current can be applied to produce a weld nugget. The slower movement from the intermediate position (FIG. 4) to the work position (FIG. 6) ensures that the impact force between the welding caps 16 and the workpiece is minimized. However, the preceding, more rapid movement of the rod 20 ensures that cycle time is not unduly compromised. The present invention reduces the impact force of the caps engaging the workpiece while not significantly increasing cycle times. Further, the invention decouples the retract stroke length of a cylinder from low impact performance. That is, the invention can meet desired low impact targets using the same components for cylinders having various retract stroke lengths.

Referring to FIG. 2, ports P1 and P3 are provided by the end cap 32. Ports P2 and P4 are provided by the front block 28, which also slideably supports the rod 20 with bushing 59. A retract piston assembly 40 is slideably supported by the barrel 34. The retract piston assembly 40 includes a barrel 46 having forward and rearward flanges 42 and 44 secured at opposite ends using retaining ribbons 48. The retract piston assembly 40 separates a cavity 50 provided by the barrel 34 into first and second chambers 52 and 54. The retract piston assembly 40 is shown in a retract-return position in FIG. 2 and a retract-forward position in FIGS. 4 and 6.

The retract piston assembly 40 includes a weld flange 64, which is threadingly secured to an end of the rod 20 opposite an end 60 of the rod 20. The end 60 is secured to one of the arms 12. The weld flange 64 is arranged within the retract piston assembly 40 between the forward and rearward flanges 42 and 44 in a cavity 66 that is separated by the weld flange 64 into third and fourth chambers 68 and 70. The fourth chamber 70 acts as a cushion chamber to reduce the impact between the caps and the workpiece. The weld flange 64 is shown in a weld-return position in FIGS. 2 and 4 and moving toward a weld-forward position in FIG. 6. The work position depicted in FIG. 6 includes a range of positions once the rod 20 begins to move. The rod 20 continues to advance a distance as the pressure builds to allow the weld-force pressure to build quickly.

Referring to FIG. 3A, the inventive pneumatic cylinder 18 includes a cushion or differential pressure valve 78 supported by the rearward flange 44 of the retract piston assembly 40. A seal 82 is arranged between the cushion valve 78 and the return flange 44. A spring 84 is arranged between a plate 86, which is secured to the rearward flange 44 by screws 88 (only one shown), and the cushion valve 78. The spring 84 biases the cushion valve 78 to a closed position, which is shown in FIGS. 2, 3A and 4. The cushion valve 78 has a pre-orifice 73 that provides a predetermined, controlled leak of the pressurized cushion chamber 70 through passage 72.

The retract piston assembly 40 includes notches 75. Wear bands 67 are arranged at the notches 75 to keep the retract piston assembly 40 centered within the barrel 34. An annular space 77 is provided between the barrels 34 and 46. The rearward flange 44 carries a seal 76 that provides a seal between the barrel 34 and the rearward flange 44. A passage 74 in the rearward flange 44 provides a fluid connection between one side of the cushion valve 78 and the retract-forward port P3.

An isolator 80 is arranged concentric with and inside of the cushion valve 78. The isolator 80 is sealed against the cushion valve 78 with seals 79. A spring 81 acts against a retainer that is secured to the isolator 80 to bias the isolator 80 to the closed position shown in FIGS. 2 and 3A. The pressure in the cushion chamber 70 and spring 81 apply sufficient force to the isolator 80 to maintain the isolator 80 in the closed position with the retract-return air applied to the isolator from the second chamber 54.

Referring to FIG. 3B, the front block 28 supports a trip valve 98 that is biased to a closed position against a plate 90 by a spring 92. The plate 90 is secured to the front block 28 by screws (not shown). A seal 100 is arranged between the rod 20 and the trip valve 98.

With continuing reference to FIGS. 2, 3A and 3B, which depict the home position, the cushion chamber 70 has already been pressurized by weld-return air subsequent to welding the workpiece. Specifically, from the work position shown in FIG. 6, the weld-return port P2 is actuated (along with the retract-return port P4) to obtain the home position of FIG. 2. However, in the home position of FIG. 2, the weld-return port P2 is pressurized, but pressurized air is prevented from acting on the retract piston assembly 40 with the trip valve 98 in the closed position. The retract-return port P4 provides pressurized air to the second chamber 54 to retain the retract piston assembly 40 in the retracted position.

The intermediate position is shown in FIGS. 4 and 5 and is achieved by pressurizing the weld-return and retract-forward ports P2 and P3. As the first chamber 52 is pressurized, the second chamber 54 is exhausted through vented retract-return port P4. Seals 102 on the rearward flange 44 engage the front block 28 and plate 90 to prevent the second chamber 54 from fully exhausting through the large passage 104. Instead, the remaining pressure in second chamber 54 is exhausted through cushion passage 106 thereby smoothing the engagement between retract piston assembly 40 and front block 28.

The isolator 80 and trip valve 98 engage one another forcing both the isolator 80 and trip valve 98 to the open positions, best seen in FIG. 5. As a result, an opening 108 is created between the trip valve 98 and plate 90 to fluidly connect the weld-return port P2 and newly created chamber 110 through the opening 108.

The opened isolator 80 provides an opening 112 between the isolator 80 and cushion valve 78 that is fluidly connected to an annular passage 114. A hole 115 in the cushion valve 78 (in addition to the pre-orifice 73) fluidly connects the annular passage 114 to the passage 72 so that the cushion chamber 70 is in fluid communication with the weld-return port P2. Pre-orifice 73 may be situated on rearward flange 44 instead of on cushion valve 78. Furthermore, pre-orifice 73 and hole 115 can each be comprised of one or more holes or passages. The pre-orifice 73, of a smaller net flow area than hole 115, allows only a small amount of cushion fluid to escape to the vented port P2, just enough to smooth the transition at the intermediate position when stroking from the home to work positions directly. The pressure in the cushion chamber 70 is "topped off" prior to actuating the cylinder to the work position.

Prior embodiments allow cushion air to flow freely, to the point where insufficient pressure remains in the cushion chamber 70 for achieving low-impact operation, especially for cylinders with longer retract stroke lengths. The isolator 80 "isolates" the cushion chamber 70 from hole 115 so that during the retract stroke, cushion air can escape through the pre-orifice 73. This way, the transition at the intermediate position can be smoothed by the pre-orifice's effect of slightly reducing cushion pressure without compromising low-impact operation that would otherwise occur should cushion air be allowed to escape through hole 115 during the retract stroke.

One side of the cushion valve 78 is exposed to pressure from the retract-forward port P3 through notches 75, annular space 77 and passage 74. However, the retract-forward pressure is not sufficient to overcome the weld-return pressure and the spring 84 to open the cushion valve 78.

The cylinder is actuated from the intermediate position (FIGS. 4 and 5) to the work position shown in FIGS. 6 and 7 by pressurizing the weld-forward port P1 and the retract-forward port P3. The weld-return port P2 is vented while the cushion chamber 70 and weld-return port P2 are still fluidly connected to one another.

Referring to FIGS. 6 and 7, the pressurized fluid enters the third chamber 68 through passage 118 in tube 116 that is fluidly connected to the weld-forward port P1. The tube 116 is threaded into end cap 32 and sealed relative to forward flange 42 by seal 117. As the pressure rises in the third chamber 68, the weld flange 64 advances, but initially with the cushion valve 78 and isolator 80 in the positions shown in FIG. 5.

Figure 8:
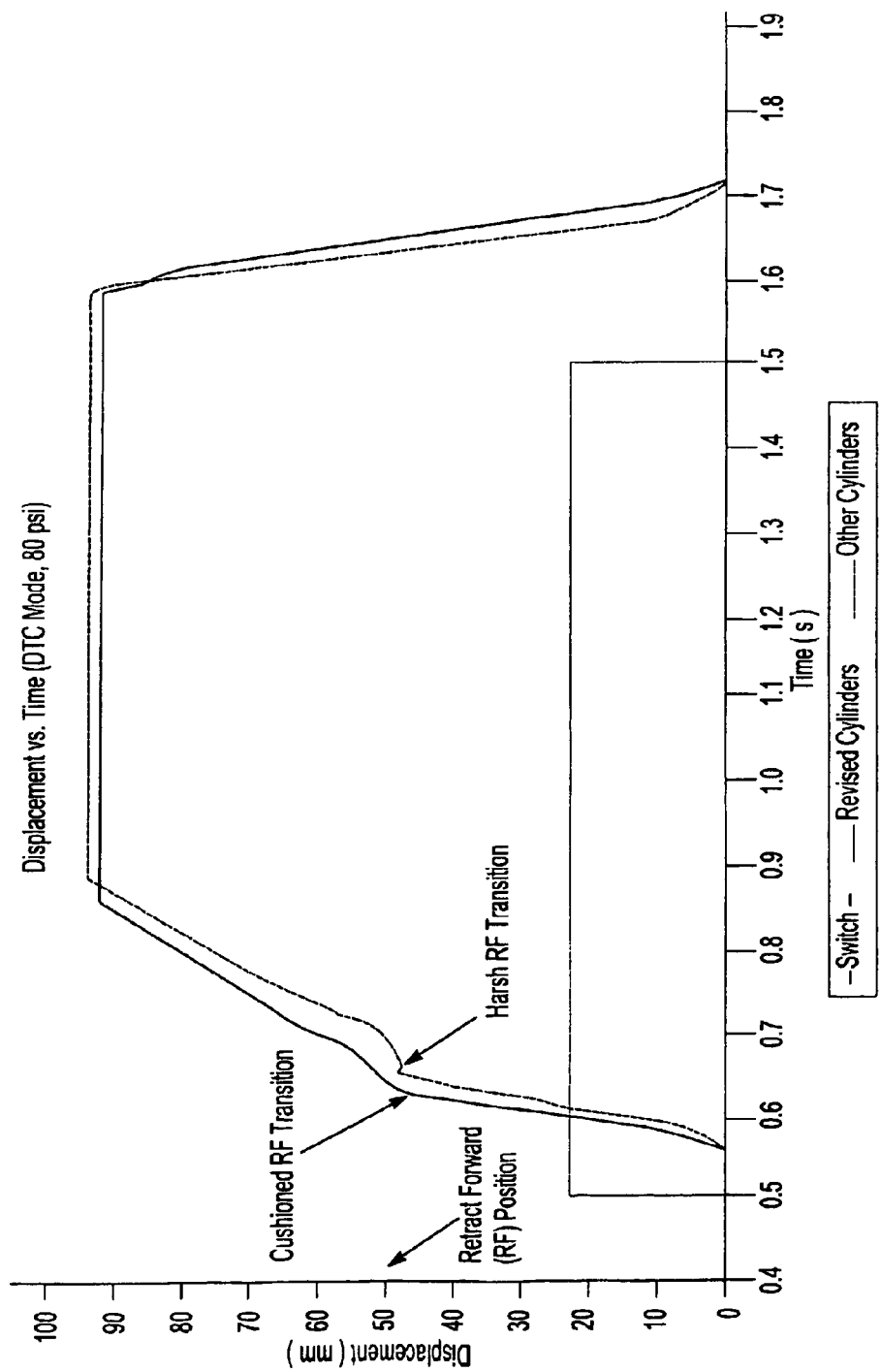
FIG. 8 is a graphical depiction of the inventive pneumatic cylinder as compared to other cylinders.

With reference to FIG. 5, as the weld flange 64 advances, the air from cushion chamber 70 is exhausted slowly through the pre-orifice 73 and hole 115 out weld-return port P2 to cushion the contact between the weld caps and the workpiece. The pressure in cushion chamber 70 finally drops to a level at which pressure from the retract-forward port P3 at passage 74 overcomes the pressure in cushion chamber 70 and spring 84 to open the cushion valve 78, as shown in FIG. 7. Pressure in passage 74 acts on a side of the cushion valve 78 exposed to a cavity 122. The cushion valve 78 engages the isolator 80 in the open position. In the open position, the air in the cushion chamber 70 is permitted to exhaust rapidly through annular opening 124 out the weld-return port P2 so that welding force can rise rapidly. The effects of the controlled exhausting of cushion chamber 70 of the inventive cylinder are shown in FIG. 8. By comparison, the harsh impact of other cylinders is eliminated. The "switch" in FIG. 8 indicates the triggering of the valves to pressurize ports P1 and P3.

The cylinder is actuated to either the intermediate or home positions by pressurizing the cushion chamber 70 with air from the weld-return port P2. The weld flange 64 is moved to the returned position. Once the cushion chamber 70 is filled, the pressure in the cushion chamber 70 will close the cushion valve 78.

The above inventive arrangement may also be used for a dual piston arrangement, shown in FIG. 9, which is similar to the single piston cylinder described above. The dual piston cylinder 18' includes a middle separator 30 dividing barrels 34a and 34b. The middle separator 30 acts as the front block described above relative to the single piston cylinder. A first rod portion 20a is supported by the middle separator 30, and a second rod portion 20b is supported by a front block 28'. A second weld flange 62 is secured between the rod portions 20a and 20b. A second weld-forward port P1 is provided on the middle separator 30 to provide pressurized air to the second weld flange 62. A vent is provided in the front block 28' to permit air to be exhausted from forward chamber 130. The cylinder may also be used as a five port cylinder by independently controlling the two ports labeled as P1 in FIG. 9.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A weld cylinder comprising:
   a cylinder supporting a rod providing home, intermediate and work positions;
   a retract piston assembly arranged in the cylinder and movable between retract-return and retract-forward positions;
   a weld flange arranged in the retract piston assembly and movable between weld-return and weld-forward positions, the weld flange supporting the rod;
   retract-return, weld-return positions, retract-forward and weld-forward ports pressurized to provide the corresponding retract-return, weld-return positions, retract-forward and weld-forward positions, wherein the home position corresponds to the retract-return and weld-return positions with the non-corresponding ports vented, the intermediate position corresponds to the retract-forward and weld-return positions with the non-corresponding ports vented, the work position corresponds to the retract-forward and weld-forward positions with the non-corresponding ports vented;
   a differential pressure valve fluidly connected to the weld-return and retract-forward ports in at least one of the intermediate and work positions to actuate the differential pressure valve between closed and open positions; and
   an isolator valve configured to cooperate with the differential pressure valve to create a passage and exhaust fluid from a cushion chamber through the passage.

2. The weld cylinder according to claim 1, wherein the cylinder includes a barrel supported between a front block and an end cap, and the retract piston assembly includes a second barrel arranged between forward and rearward flanges, the weld flange arranged between the forward and rearward flanges within the second barrel and annular space between the barrels.

3. The weld cylinder according to claim 2, wherein the forward flange including a slot and the rearward flange including another passage, with the annular space, slot and the other passage in fluid communication with the retract-forward port.

4. The weld cylinder according to claim 3, wherein a seal is arranged between the rearward flange and the barrel.

5. The weld cylinder according to claim 3, wherein the other passage provides pressurized fluid to the differential pressure valve in the work position to move the differential pressure valve to the open position.

6. The weld cylinder according to claim 5, wherein a spring coacts with the differential pressure valve to oppose movement from the closed position to the open position.

7. The weld cylinder according to claim 5, wherein the cushion chamber is provided between the weld and rearward flanges exhausts at a first rate prior to the intermediate position and at a second rate in the work position, the second rate greater than the first rate.

8. A weld cylinder comprising:
   a cylinder supporting a rod providing home, intermediate and work positions, the cylinder including a barrel supported between an end cap and one of a front block and middle separator;
   a retract piston assembly arranged within the barrel and movable between retract-return and retract-forward positions;
   a weld flange arranged within the retract piston assembly and movable between weld-return and weld-forward positions, the weld flange supporting the rod, a chamber arranged between the weld flange and a rearward flange;
   retract-return, weld-return positions, retract-forward and weld-forward ports pressurized to provide the corresponding retract-return, weld-return positions, retract-forward and weld-forward positions, wherein the home position corresponds to the retract-return and weld-return positions with the non-corresponding ports vented, the intermediate position corresponds to the retract-forward and weld-return positions with the non-corresponding ports vented, the work position corresponds to the retract-forward and weld-forward positions with the non-corresponding ports vented, the weld-return port provided by the one of the front block and middle separator, the weld-return port in fluid communication with the piston in the weld-return position; and
   an isolator valve configured to move a trip valve to an open position, the trip valve in the open position fluidly connecting the weld-return port to a differential pressure valve, pressurized fluid from the weld-return port moving the differential pressure valve to an open position to fluidly connect the weld-return port to the chamber and fill the chamber with the pressurized fluid.

9. The weld cylinder according to claim 8, wherein the one of the front block and middle separator provides the weld-retract and return-retract ports.

10. The weld cylinder according to claim 8, wherein the weld-return port is fluidly disconnected from the retract piston assembly in the home position.

11. The weld cylinder according to claim 8, wherein the retract piston assembly includes a second barrel arranged between a forward flange and the rearward flange, the weld flange arranged between the forward and rearward flanges within the second barrel, the retract-forward port providing pressurized fluid exerted on the forward flange to move the retract piston assembly to the retract-forward position, the rearward flange engaging the one of the front block and middle separator to fluidly connect the weld-return port to the chamber arranged between the weld and rearward flanges.

12. The weld cylinder according to claim 11, wherein the forward flange includes a notch providing a passage fluidly connecting the retract-forward port to an annular passage arranged between the barrels, and a seal arranged between the rearward flange and the barrel.

13. The weld cylinder according to claim 11, wherein the isolator valve is on the rearward flange.

14. The weld cylinder according to claim 8, wherein the barrel provides a wall extending between the one of the front block and middle separator and end cap, the wall being generally unbroken for preventing the passage of fluid through the barrel.

15. A method of welding by moving from a retracted weld position to an extended weld position, the method comprising the steps of:
 a) filling a cushion chamber that opposes movement from the retracted weld position to the extended weld position;
 b) exhausting fluid from the cushion chamber through a pre-orifice while a differential pressure valve is in a closed position;
 c) opening an isolator valve while the differential pressure valve is in the closed position to create a passage and exhausting fluid from the cushion chamber through the passage, wherein the differential pressure valve and the isolator valve are concentric with one another and movable relative to one another and a supporting flange; and
 d) opening the differential pressure valve to rapidly exhaust the fluid from the cushion chamber.

16. The method according to claim 15, wherein the method includes movement between home, intermediate and work positions.

17. The method according to claim 15, wherein step a) includes fluidly connecting a weld-return port with the cushion chamber by opening a trip valve.

18. The method according to claim 17, wherein step a) includes engaging the trip valve with the isolator valve to open the trip valve.

19. The method according to claim 15, wherein step d) is performed by increasing a retract-forward pressure while exhausting the cushion chamber.

20. The method according to claim 15, wherein the differential pressure and isolator valves are spring biased to closed positions prior to performing step b).

21. The method according to claim 15, wherein the pre-orifice is provided in the differential pressure valve.

22. The weld cylinder according to claim 13, wherein the differential pressure valve and the isolator valve are concentric with one another and movable relative to one another and the rearward flange.

23. The weld cylinder according to claim 22, comprising a pre-orifice configured to exhaust fluid from the chamber, the isolator valve is configured to open while the differential pressure valve is in a closed position to create a passage and exhausting fluid from the chamber through the passage.

24. The weld cylinder according to claim 23, wherein the pre-orifice is provided in the differential pressure valve.

25. The weld cylinder according to claim 7, wherein the differential pressure valve and the isolator valve are concentric with one another and movable relative to one another and the rearward flange.

26. The weld cylinder according to claim 25, comprising a pre-orifice configured to exhaust fluid from the cushion chamber while a differential pressure valve is in a closed position.

27. The weld cylinder according to claim 26, wherein the pre-orifice is provided in the differential pressure valve.

* * * * *